United States Patent [19]
Koch et al.

[11] Patent Number: 5,925,589
[45] Date of Patent: Jul. 20, 1999

[54] PROCESS FOR THE MANUFACTURE OF A SUPPORT FOR OLEFIN POLYMERIZATION CATALYSTS AND PROCESS FOR THE POLYMERIZATION OF OLEFINS

[75] Inventors: Benoit Koch, Hannut; André Rulmont, Liége; Fabienne Wijzen, Ayeneux, all of Belgium

[73] Assignee: Solvay (Societe Anonyme), Brussels, Belgium

[21] Appl. No.: 08/684,205

[22] Filed: Jul. 19, 1996

[30] Foreign Application Priority Data

Jul. 31, 1995 [BE] Belgium .................................. 9500659

[51] Int. Cl.⁶ ...................................................... B01J 27/14
[52] U.S. Cl. .......................... 502/208; 502/232; 502/344; 502/407; 502/414; 526/104; 526/126; 526/135
[58] Field of Search ...................................... 502/208, 232, 502/344, 407, 414

[56] References Cited

U.S. PATENT DOCUMENTS 3,609,099  9/1971  Mickeolson .............................. 252/435
3,650,783  3/1972  Yates ......................................... 106/69
4,397,761  8/1983  McDaniel et al. .................. 252/429 C

FOREIGN PATENT DOCUMENTS 2455557  5/1976  Germany .
94/26790  11/1994  WIPO .

*Primary Examiner*—David W. Wu
*Attorney, Agent, or Firm*—Venable; George H. Spencer; John W. Schneller

[57] ABSTRACT

Process for the manufacture of a support for olefin polymerization catalysts comprising silica, aluminium phosphate and optionally alumina, according to which a source of silica, chosen from alkaline aqueous silica sols and alkaline aqueous solutions of inorganic silicate, is added, in a first step, to an aqueous solution of a source of phosphate ions which has a pH of less than 5, the pH of the medium being maintained below 5 throughout the first step, an aluminium compound is added, in a second step, to the medium obtained from the first step and a precipitate is formed, in a third step, by adding a precipitation agent to the medium obtained from the second step, the pH of the precipitation medium being maintained above or equal to 5.

9 Claims, No Drawings

PROCESS FOR THE MANUFACTURE OF A SUPPORT FOR OLEFIN POLYMERIZATION CATALYSTS AND PROCESS FOR THE POLYMERIZATION OF OLEFINS

FIELD OF THE INVENTION

The present invention relates to a process for the manufacture of a support for olefin polymerization catalysts, in particular a support containing silica, aluminium phosphate and possibly alumina. The invention also relates to a process for the polymerization of olefins using a chromium catalyst deposited on supports obtained by means of the abovementioned process.

TECHNOLOGY REVIEW

Compositions containing silica and aluminium phosphate are already known. For example, U.S. Pat. No. 3,650,783 discloses compositions containing silica and a trivalent phosphate such as aluminium phosphate. These compositions may be prepared by placing a colloidal silica sol in contact simultaneously with a source of a trivalent metal cation (such as aluminium) and a source of phosphate (such as phosphoric acid), optionally adding a basic compound such as ammonium hydroxide thereto.

Moreover, U.S. Pat. No. 4,397,761 discloses supports based on silica and aluminium phosphate which may be prepared (according to the first technique of method C) by combining a silicate (for example sodium silicate) simultaneously with a source of aluminium ions (such as an aluminium salt) and a source of phosphate ions (for example phosphoric acid) and neutralizing the mixture by addition of a base (such as ammonium hydroxide) in order to obtain a cogel.

These known techniques have the drawback of leading to heterogeneous compositions in which agglomerates of aluminium phosphate are deposited on the surface of the silica. Heterogeneous compounds crystallize too quickly, when they are calcinated at temperatures above 700° C., for them to be suitable as supports for olefin polymerization catalysts.

Patent application WO 94/26790 (SOLVAY) has already proposed preparing supports containing silica, alumina and/or aluminium phosphate of homogeneous and amorphous structure by mixing, in a first step, an alcohol, water, a silicon alkoxide and an acid, adding thereto, in a second step, an acidic solution of an aluminium compound and/or a solution of a source of phosphate ions, and, in a third step, a gelling agent, in order to obtain a precipitate, washing the precipitate and then drying it until a powder is obtained, and calcining the powder.

SUMMARY OF THE INVENTION

The present invention is directed towards overcoming the abovementioned drawbacks and providing a novel process which also makes it possible to obtain supports of homogeneous composition, that is to say amorphous coprecipitates in which the constituents (silica, aluminium phosphate and optionally alumina) are dispersed homogeneously and which have a high resistance to crystallization. Another object of the invention is to provide supports having a high specific surface and a high pore volume, such that they can be used as supports for olefin polymerization catalysts.

DETAILED DESCRIPTION OF THE INVENTION

Consequently, the subject of the invention is a process for the manufacture of a support for olefin polymerization catalysts comprising silica, aluminium phosphate and optionally alumina, according to which a source of silica, chosen from alkaline aqueous silica sols and alkaline aqueous solutions of inorganic silicate, is added, in a first step, to an aqueous solution of a source of phosphate ions which has a pH of below 5, the pH of the medium being maintained below 5 throughout the first step, an aluminium compound is added, in a second step, to the medium obtained from the first step and a precipitate is formed, in a third step, by adding a precipitation agent to the medium obtained from the second step, the pH of the precipitation medium being maintained above or equal to 5 throughout the third step.

One of the essential characteristics of the invention is based on the fact that the aluminium compound is not used simultaneously with the source of silica and the source of phosphate ions, but is added in a subsequent step after the source of silica has been mixed with the source of phosphate ions. Another important characteristic of the invention is based on the fact that the pH is maintained below 5 (preferably below 4) throughout the first step. This proved to be necessary to prevent any gelation or precipitation of the mixture containing the source of silica and the source of phosphate ions, which would lead to a heterogeneous structure.

The first step of the process according to the invention is preferably carried out by pouring the source of silica quickly and with vigorous stirring into the aqueous solution of a source of phosphate ions so as to prevent the pH exceeding, even locally, the maximum value of 5.

The source of silica used in the first step of the process according to the invention generally has a pH of at least 8, preferably of at least 9. The pH of the source of silica may be adjusted by addition of a basic compound such as sodium hydroxide. The source of silica may be used at room temperature. When the source of silica is a silica sol, it is advantageous to use it at a temperature of from 40 to 80° C., preferably of from 50 to 70° C.

For the purposes of the present invention, the expression inorganic silicate is understood to denote a salt of silicic acid. This may be any known type of silicic acid such as, for example, diorthosilicic acid ($Si_2O_7H_6$), monometasilicic acid ($SiO_3H_2$), trimesosilicic acid ($Si_3O_8H_4$), tetraparasilicic acid ($Si_4O_{10}H_4$), pentatetrerosilicic acid ($Si_5O_{12}H_4$), etc. The inorganic silicate is preferably chosen from alkali metal silicates, such as sodium silicates and potassium silicates. Sodium silicates are particularly suitable for use.

For the purposes of the present invention, the expression aqueous silica sol is understood to denote a suspension in water of colloidal particles (of average size ranging from 0.001 to 1 $\mu$m) in such a low amount that the particles do not form a lattice.

The expression source of phosphate ions is understood to denote any compound which is soluble in the solution used in the first step and which is capable of forming phosphate ions therein. Examples which may be mentioned are inorganic phosphate salts, for example monocalcium phosphate of formula $CaH_4(PO_4)_2$, disodium phosphate of formula $Na_2HPO_4$ and tricalcium phosphate of formula $Ca_3(PO_4)_2$. They may also be phosphate salt-ethers, for example ethyl phosphate of formula $(C_2H_5)_3PO_4$. Ammonium phosphate and phosphoric acid may also be mentioned. Phosphoric acid is preferably used.

The pH of the aqueous solution of a source of phosphate ions is preferably below 4, for example from 1 to 2. It may be adjusted by addition of an acidic compound such as nitric acid or hydrochloric acid. Hydrochloric acid is suitable for use.

The duration of the first step of the process according to the invention is generally at least 1 minute, in particular at least 5 minutes. It is usually not more than 1 hour, durations of not more than 10 minutes being the most common.

During the first step of the process according to the invention, it is generally recommended to work at room temperature, that is to say without heating or cooling the mixture of the source of silica with the source of phosphate ions.

The second step of the process according to the invention consists in adding an aluminium compound to the medium obtained from the first step. It is preferable, as in the first step, to maintain the pH of the medium below 5 throughout the second step. To this end, an acidic solution of the aluminium compound, preferably of pH below 5, may be used. The second step may be carried out at a temperature within the range from room temperature to 80° C., in particular from room temperature to 50° C. It is not recommended to heat the medium obtained from the first step, nor to heat the aluminium compound before using it.

The aluminium compound used in the second step of the process according to the invention may be chosen from inorganic aluminium salts. Aluminium nitrate and aluminium chloride are particularly preferred.

The duration of the second step of the process according to the invention is generally at least 1 minute, in particular at least 5 minutes. It is usually not more than 1 hour, durations of not more than 15 minutes being the most common.

The amounts of source of silica, of aluminium compound and of source of phosphate ions used in the process according to the invention may vary within a wide range and are determined by the final composition desired for the support. When it is desired to obtain a support containing only silica and aluminium phosphate, the amounts of source of silica, of aluminium compound and of source of phosphate ions are advantageously such that the support contains silica and aluminium phosphate in a molar ratio of from 0.01 to 99 (preferably of from 0.05 to 20). When it is desired for the support also to contain alumina, the amounts used are generally such that the support contains silica (X), alumina (Y) and aluminium phosphate (Z) in an (X):(Y):(Z) molar percentage of (10 to 95):(1 to 80):(1 to 85), and more particularly of (20 to 80):(1 to 60):(5 to 60).

The third step of the process according to the invention consists in forming a precipitate under the effect of a precipitation agent, which may be chosen from any compound capable of coprecipitating the reactants used in the first and second steps (the source of silica, the source of phosphate ions and the aluminium compound). Examples of precipitation agents which may be mentioned are ethylene oxide, ammonium carbonate and ammonium hydroxide. Ammonium hydroxide is suitable for use. The pH of the coprecipitation medium is above or equal to 5, typically above or equal to 6; it is usually below 11, values below 10 being recommended, for example about 8. The pH is preferably maintained at a constant value throughout the coprecipitation.

The amount of precipitation agent used in the third step is generally sufficient to allow complete coprecipitation of the source of silica, the source of phosphate ions and the aluminium compound; it is preferably slightly larger than this sufficient amount.

The third step of the process according to the invention is preferably performed at a temperature below or equal to 30° C., in particular at a temperature of from 0 to 20° C. To this end, when a silica sol is used in the first step at a temperature of from 40 to 80° C. as described above, it is recommended to cool the mixture obtained from the second step to a temperature below or equal to 30° C. before adding the precipitation agent.

The third step of the process according to the invention may optionally be prolonged by a maturation step whose function is to prolong the coprecipitation and thus to modify the specific surface and pore volume of the precipitate. The duration of the maturation may range from 5 minutes to 50 hours. The best results are obtained with a duration of at least 1 hour. For economic reasons, there is no advantage in prolonging the maturation beyond 10 hours.

In a specific embodiment of the process according to the invention, the third step is followed by subsequent steps in which the precipitate obtained from the third step is washed and dried until a powder is obtained, and this powder is calcined.

The precipitate obtained from the third step of the specific embodiment of the process according to the invention may be washed by any suitable known technique. This generally consists in placing the precipitate in contact with an amount of water which is sufficient to eliminate the impurities contained in the precipitate, and in then eliminating at least some of this amount of water by any suitable known means, for example by centrifugation or by filtration. Next, the precipitate washed with water may be subjected to washing with an organic liquid whose function is to eliminate the water which impregnates the precipitate. Alcohols are suitable for use.

The washed precipitate is then subjected to a drying operation which may be carried out according to any suitable known technique, for example by spraying or by distillation, preferably azeotropic distillation, so as to evaporate the water and possibly the organic liquid which have not been eliminated earlier, until a powder is obtained.

After drying, a support powder is collected, which is subjected to a calcination, well known to those skilled in the art, whose function is to extract the inorganic impurities from the powder at high temperature. It is generally continued until the weight of the powder remains constant over time, while at the same time avoiding crystallization of the powder. The calcination is generally carried out at a temperature of from 300 to 1500° C., typically of from 350 to 1000° C., preferably of from 400 to 600° C.

The manufacturing process according to the invention allows the production of supports which generally have a specific surface of at least 100 m$^2$/g, in particular of at least 180 m$^2$/g, values of at least 220 m$^2$/g being the most favourable. The specific surface is usually not more than 800 m$^2$/g, more precisely not more than 700 m$^2$/g, values of not more than 650 m$^2$/g being the most common. The specific surface (SS) of the support is measured according to the volumetric method (BET) of British Standard BS 4359/1 (1984).

The supports prepared using the process according to the invention advantageously have a crystallization temperature of at least 700° C., for example of at least 1000° C. The crystallization temperature is usually not more than 1800° C., in particular not more than 1500° C. The crystallization temperature of the support is determined by subjecting a sample of the support to a heat treatment at various temperatures (500° C., 700° C., 800° C., 950° C., 1050° C., etc.), and then examining, after each heat treatment, this sample by X-ray diffraction.

The supports obtained by means of the process according to the invention usually have a pore volume of at least 1.5 cm³/g, more especially of at least 2 cm³/g, values of at least 2.2 cm³/g being recommended. The pore volume is generally not more than 5 cm³/g, in particular not more than 4.5 cm³/g, values of not more than 4 cm³/g being common. The pore volume (PV) is the sum of the pore volume consisting of pores less than or equal to 75 Å in radius, measured by the nitrogen penetration method (BET) according to the volumetric technique described in British Standard BS 4359/1 (1984), and of the pore volume measured by the mercury penetration method using a porosimeter of type PORO 2000 marketed by Carlo Erba Co., according to Belgian Standard NBN B 05-202 (1976). The supports preferably have a specific surface (SS) and a pore volume (VP) which correspond to the relationship:

$$SS<(VP\times 682-542),$$

in which SS and VP are respectively the numerical values of the specific surface expressed in m²/g and of the pore volume expressed in cm³/g. The supports, which are of particularly high performance, correspond to the relationship:

$$SS<(VP\times 682-573).$$

The supports obtained by means of the process according to the invention are generally in the form of a powder whose grains have a diameter of from 20 to 200 µm. They usually have an apparent density of greater than or equal to 50 kg/m³, in particular 100 kg/m³; it is generally at most equal to 500 kg/m³, typically 300 kg/m³. The apparent density is measured by free flow according to the following procedure: the support powder to be analysed is poured into a 50 cm³ cylindrical container, taking care not to pack it down, from a hopper whose lower rim is positioned 20 mm above the upper rim of the container. The container filled with the powder and levelled off with a rectilinear lath is then weighed, the tare is deducted from the weight recorded and the result obtained (expressed in g) is divided by 50.

The supports obtained by means of the process according to the invention are particularly advantageous for use as supports for olefin polymerization catalysts, the catalysts advantageously consisting of chromium oxide. These catalysts may be obtained in a manner which is known per se, by impregnation of the support powder with an aqueous or organic solution of a chromium compound, followed by drying in an oxidizing atmosphere, and activation by heating to a high temperature (from 400 to 1000° C. for example) in order to convert at least some of the chromium to hexavalent chromium. The catalysts may also be obtained by means of mechanical mixing of the support powder with a solid chromium compound. This mixture may subsequently be preactivated at a temperature below the melting point of the chromium compound, before activating it conventionally as described above. The chromium is generally present in the catalysts in a proportion within the range of from 0.05 to 10% by weight, preferably of from 0.1 to 5% by weight, more particularly of from 0.25 to 2% by weight of chromium based on the total weight of the catalyst.

The catalysts may be used for the polymerization of olefins, in particular olefins containing from 2 to 8 carbon atoms, and more particularly for the production of ethylene homopolymers or of ethylene copolymers with one or more comonomers preferably selected from olefins containing from 2 to 8 carbon atoms. The preferred comonomers are butene and hexene.

The invention consequently also relates to a process for the polymerization of olefins, according to which at least one olefin is placed in contact, under polymerization conditions, with a chromium-based catalyst deposited on a support which is manufactured according to the process described above.

The polymerization process is preferably carried out in suspension in a hydrocarbon diluent such as liquid aliphatic, cycloaliphatic and aromatic hydrocarbons, at a temperature such that at least 80% (preferably at least 90%) of the polymer formed is insoluble therein. The preferred diluents are linear alkanes such as hexane or branched alkanes such as isobutane. The polymerization temperature is generally chosen from 20 to 200° C., preferably from 50 to 150° C., in particular from 80 to 115° C. The ethylene pressure is usually selected from atmospheric pressure to 5 MPa, preferably from 0.4 to 2 MPa, more particularly from 0.6 to 1.5 MPa.

EXAMPLES

The examples whose description follows serve to illustrate the invention. In these examples, supports were prepared which were used to manufacture chromium-based catalysts deposited on these supports. These catalysts were then used to polymerize ethylene.

The meaning of the symbols used to express the magnitudes mentioned and the methods of measuring these magnitudes are explained below.

SS=specific surface of the support, expressed in m²/g and measured as described above.

PV(N₂)=pore volume of the support, expressed in cm³/g and measured by the nitrogen penetration method as described above.

PV(Hg)=pore volume of the support, expressed in cm³/g and measured by the mercury penetration method as described above.

$T_c$ =crystallization temperature of the support, expressed in °C. and measured as described above.

α=catalytic activity, expressed in grams of polymer, obtained per hour and per gram of catalyst used and divided by the concentration of the olefin in the isobutane.

HLMI=melt index of the molten polymer, measured at 190° C. under a load weighing 21.6 kg and expressed in g/10 min, according to ASTM Standard D 1238 (1986).

SD=standard density of the polymer, expressed in kg/m³ and measured according to ISO Standard 1183 (1987).

Ol=oligomer content in the polymer, expressed in grams of oligomers per kilo of polymer and measured by extraction with hexane at its boiling point.

Example 1
(in accordance with the invention)
1. Preparation of the support
1.a. First step A source of silica was prepared by adding 10.01 g of silica to 250 g of aqueous 1 M NaOH solution at about 65° C. A phosphoric acid solution was prepared by mixing 19.2 g of 85% concentrated phosphoric acid solution with 30 g of water and 10 ml of 32% hydrochloric acid solution. The source of silica was poured into the phosphoric acid solution with vigorous stirring. The pH of the solution obtained is about 1.7.

1.b. Second step 40.225 g of aluminium chloride (AlCl₃.6H₂O) were dissolved in the medium obtained from the first step. The medium was then cooled to 20° C.

1.c. Third step

The medium obtained from the second step was added to aqueous ammonium hydroxide solution (500 ml) of pH 8, thermostatically adjusted to 10° C., the pH being kept constant at a value of 8 by addition of concentrated ammonium hydroxide solution.

1.d. Maturation, washing, drying and calcination

The precipitate thus obtained was subjected to maturation for 2 h at 60° C. with gentle stirring. It was then washed with a solution containing 0.5 M $NH_4Cl$, then with water and finally with isopropanol. The washed precipitate was subjected to a distillation of the water-isopropanol azeotrope at atmospheric pressure and then at reduced pressure, so as to obtain a powder. The powder was then calcined in a fluidized bed flushed with dry air for 4 hours at 500° C. A powder having the following characteristics was collected:

SS=210

$PV(N_2)$=1.52

PV(Hg)=2.76

Composition:

$AlPO_4$: 47.9 mol %

$SiO_2$: 48.4 mol %

$Al_2O_3$: 3.8 mol %

$T_{C>}$700° C.

2. Preparation of the chromium catalyst

The support obtained in (1) was mixed with chromium acetylacetonate in an amount such that the mixture comprised 0.7% by weight of chromium. The mixture thus obtained was then treated in a fluidized bed at 150° C. for 2 h while flushing with dry air. It was then calcined in the fluidized bed at 700° C. for 16 h under dry air and the catalyst was collected.

3. Polymerization of ethylene 138 mg of the catalyst obtained in (2) and 1 litre of isobutane were introduced into a 3-litre autoclave. The temperature was raised to 102° C. and ethylene, hexene and hydrogen were introduced into the autoclave in hydrogen/ethylene and hexene/ethylene molar concentration ratios of 0.04 and 0.05 respectively. The ethylene pressure and the temperature were kept constant for the period necessary to produce 323 g of polyethylene. The polyethylene had the following properties:

HLMI=7.7

SD=951.4

Ol=12

The catalyst had an activity α of 19224.

Example 2

(in accordance with the invention)

1. Preparation of the catalyst

The operations of Example 1 were repeated with the exception of the amounts of reactants used, which were adjusted to obtain a support having the following properties:

SS=160

$PV(N_2)$=1.96

PV(Hg)=2.36

Composition:

$AlPO_4$: 35.6 mol %

$SiO_2$: 30.7 mol %

$Al_2O_3$: 33.8 mol %

$T_{C>}$900° C.

2. Polymerization of ethylene

The operations of Example 1 were repeated. The polyethylene had the following characteristics:

HLMI=16.2

SD=949.2

Ol=17

The catalyst had an activity α of 25133.

What is claimed is:

1. A process for the manufacture of a homogeneous support for olefin polymerization catalysts comprising silica, and aluminium phosphate comprising:

adding a source of silica, selected from the group consisting of alkaline aqueous silica sols and alkaline aqueous solutions of inorganic silicate in a first step, to an aqueous solution of a source of phosphate ions which has a pH of below 5, and maintaining the pH of the medium below 5 throughout the first step, adding an aluminium compound in a second step, to the medium obtained from the first steps, and forming a precipitate in a third step, by adding a precipitation agent to the medium obtained from the second step, the pH of the precipitation medium being maintained above or equal to 5 throughout the third step.

2. The process according to claim 1, including washing the precipitate obtained from the third step to form a washed precipitate, and drying said washed precipitate until a powder is obtained, and calcining said powder.

3. The process according to claim 1, in which the source of silica is at a pH of at least 8.

4. The process according to claim 1, in which the source of silica is an aqueous alkaline silica sol which is at a temperature of from 40 to 80° C.

5. The process according to claim 1, in which the source of silica is an aqueous alkaline sodium silicate solution.

6. The process according to claim 1, in which the source of phosphate ions is phosphoric acid, the aluminium compound is chosen from inorganic aluminium salts and the precipitation agent is an aqueous ammonium hydroxide solution.

7. The process according to claim 1, in which the mixture obtained from the second step is cooled to a temperature below or equal to 30° C. before adding the precipitation agent and in which the pH of the precipitation medium is maintained above or equal to 6.

8. The process according to claim 1, in which the source of silica, the phosphoric acid and the aluminium compound are used in amounts such that the support contains silica (X), alumina (Y) and aluminium phosphate (Z) in an (X):(Y):(Z) molar percentage of (10 to 95):(1 to 80):(1 to 85).

9. A homogeneous support manufactured according to the process of claim 1.

* * * * *